United States Patent [19]

Black et al.

[11] Patent Number: 4,532,029
[45] Date of Patent: Jul. 30, 1985

[54] AROMATIC SOLVENT UPGRADING USING MEMBRANES

[75] Inventors: Laura E. Black; Peter G. Miasek, both of Sarnia, Canada; Georges Adriaens, Schilde, Belgium

[73] Assignee: Exxon Research and Engineering Co., Florham Park, N.J.

[21] Appl. No.: 603,031

[22] Filed: Apr. 27, 1984

[51] Int. Cl.³ .................... C07C 7/144; C10G 21/28
[52] U.S. Cl. ..................... 208/308; 208/321; 208/330; 585/819
[58] Field of Search ............. 208/308, 311, 321, 330; 585/818, 819; 210/648, 652

[56] References Cited

U.S. PATENT DOCUMENTS

| | | | |
|---|---|---|---|
| 2,923,749 | 2/1960 | Lee et al. | 260/674 |
| 2,930,754 | 3/1960 | Stuckey | 210/23 |
| 2,947,687 | 8/1960 | Lee | 210/23 |
| 2,958,657 | 11/1960 | Binning et al. | 210/23 |
| 2,960,462 | 11/1960 | Lee et al. | 208/308 |
| 2,970,106 | 1/1961 | Binning et al. | 208/347 |
| 2,981,680 | 4/1961 | Binning | 210/23 |
| 2,985,588 | 5/1961 | Binning et al. | 210/23 |
| 3,043,892 | 7/1962 | Stuckey | 260/674 |
| 3,092,571 | 6/1963 | Francis | 208/330 |
| 3,225,107 | 12/1965 | Kirkland et al. | 260/652 |
| 3,228,876 | 1/1966 | Mahon | 210/22 |
| 3,240,256 | 7/1964 | Martin et al. | 210/23 |
| 3,244,762 | 5/1966 | McKinnis | 208/330 |
| 3,370,102 | 2/1968 | Carpenter et al. | 260/674 |
| 3,504,048 | 3/1970 | Rosset | 260/674 |
| 3,556,990 | 1/1971 | Gerhold | 208/321 |
| 3,556,991 | 1/1971 | Gerhold | 208/321 |
| 3,789,079 | 1/1974 | Perry et al. | 260/681.5 |
| 3,853,754 | 12/1974 | Gosser | 210/23 |
| 3,919,075 | 11/1975 | Parc et al. | 208/180 |
| 3,930,990 | 1/1976 | Brun et al. | 208/308 |
| 4,062,882 | 12/1977 | Sen Gupta | 260/428.5 |
| 4,113,628 | 9/1978 | Alegranti | 210/500 |
| 4,115,465 | 9/1978 | Elfert et al. | 260/674 |

FOREIGN PATENT DOCUMENTS 2116071 9/1983 United Kingdom .

OTHER PUBLICATIONS

"Separation of Aromatics and Naphthenes by Permeation Through Modified Vinylidene Fluoride Films", McCandless, *Ind. Eng. Chem. Process Des. Develop.*, vol. 12, No. 3, pp. 354–359, (1973).
"Regeneration of Used Lubricating Oils by Ultrafiltration", Defives, et al., Information Chimie, #175, pp. 127–131, (Mar. 1978).

Primary Examiner—D. E. Gantz
Assistant Examiner—Glenn A. Caldarola
Attorney, Agent, or Firm—Joseph J. Allocca

[57] ABSTRACT

The present invention is directed to a process for producing high quality aromatic solvents in the middle distillate range containing 95+% aromatics by contacting the liquid feed with a perm selective membrane under pressure thereby selectively permeating the aromatic components as the high quality solvents. This separation can be performed by contacting the feed stream in combination with a low boiling light polar aromatics extraction solvent (such as acetonitrile) with the membrane. The middle distillate feed has a molecular weight range of about 120 to 250 g/mole and an aromatic content of 75 to 90 volume percent aromatics and preferably 80 to 90 volume percent aromatics. The membranes which can be employed to effect this separation are selected from the group of regenerated cellulose, cellulose acetate and polyimide membranes, preferably the polyimide membranes.

17 Claims, 4 Drawing Figures

USE OF MEMBRANE PROCESS TO UPGRADE LOW VALUE MIDDLE DISTILLATE

AROMATIC SOLVENT UPGRADING USING MEMBRANES

A process is disclosed for the production of high aromatic content solvents containing at least about 90% and preferably 95%+ aromatics from lower aromatic content middle distillates, preferably extracted middle distillates, by selective permeation of the aromatic components through a selective porous membrane. The separation of the aromatic components of the distillate is accomplished by contacting the distillate in combination with (i.e. diluted with) a low boiling light solvent with a permselective porous membrane under pressure.

The distillate feed stock is typically a middle distillate which contains a lower amount of aromatic hydrocarbon components, boiling in the kerosene range and is preferably that distillate fraction characterized as having a molecular weight range of about 120 to 250 g/mole.

Suitable feed middle distillates would be those from cracking units such as cokers, catalytic crackers or steam crackers and containing 75 to 90% aromatics and preferably 80 to 90 volume % aromatics. Alternatively, the aromatic extract from a middle distillate solvent extraction unit would be a suitable feedstock. In that case, the middle distillate fraction would be solvent extracted to recover an aromatic rich fraction using a low boiling, light, polar aromatics extraction solvent such as $SO_2$, acetonitrile, nitroethane, etc. Solvent extraction recovers an extract stream rich in aromatic hydrocarbons and a raffinate stream lean in aromatic hydrocarbons. The extract stream which usually contains 75–90% aromatics is still a low grade heavy aromatic solvent. It can be then effectively concentrated to >95% aromatics and thus upgraded to a more valuable solvent by use of the membrane separation procedure. The membrane process allows a richer aromatic stream (>95%) to be recovered than is presently possible using solvent extraction by itself (75–90% aromatics).

The middle distillate, or preferably the solvent extracted portion (extract portion) of the middle distillate (either as such or preferably after removal of the extraction solvent) is contacted with the selective membrane under reverse osmosis conditions, that is, under a pressure sufficient to overcome the osmotic pressure, the pressure typically being about 300 to 1000 psi, preferably about 300–800 psi.

The feed stream is contacted with the membrane as is or preferably mixed with a portion of light polar solvent to enhance the permeability of the aromatic components through the membrane. The light polar solvent boils at a different temperature than the aromatics components so as to facilitate separation of the solvents from the aromatics, preferably boiling at a temperature lower than the boiling point of the aromatics. While high boiling polar solvents, such as NMP, are extraction solvents they are not desirable or preferred in the present process since they boil at about the same temperatures as the aromatics and are, therefore, difficult to separate from the aromatic permeate.

The solvents of choice are described for the purposes of this specification and claims as low boiling light polar aromatics extraction solvents.

This light polar solvent can be either a deliberately added volume of solvent or in some instances the unrecovered extraction solvent, provided the extraction solvent employed was a low boiling light polar aromatics extraction solvent. The low boiling light polar aromatics extraction solvent is selected from materials such as $SO_2$, acetonitrile, nitroethane, etc. These low boiling, light polar aromatics extraction solvent are used as the desired diluents, (flux and selectivity enhancers, discussed in detail below) as such or they can be used in combination with minor quantities of non-extractive low boiling light polar solvents such as alcohols, ketones, aldehydes, ethers, esters, ether-alcohols, halogenated compounds, nitrohydrocarbons, amines, amides, nitriles, sulfur containing compounds, acids and mixtures thereof, provided the components which are mixed are compatible and do not react with each other. These non-extraction low boiling light polar solvents are present in minor quantities, typically in the range of 0 to about 20%, preferably 0 to 10%, most preferably 0%. The preferred solvents will be the more highly polar aromatics extraction solvents such as acetonitrile or a mixture such as acetonitrile/acetone. The addition of a low boiling light polar aromatics extraction solvent to the feed enhances the flux of the middle distillate hydrocarbons through the membrane and also enhances the aromatic content of the middle distillate hydrocarbons in the permeate. The flux increases as the percentage of polar solvent in the feed increases. However, for the highest aromatic content of the middle distillate in the permeate, an optimum percentage of polar solvent in the feed must be used. Feeds containing higher or lower amounts of polar solvent will give rise to a lower aromatic content of the middle distillate in the permeate. To obtain permeates containing greater than 90% aromatic content and preferably greater than 95% aromatic content in a single pass through the membrane at high flux, feeds containing 75% or more aromatic content must be employed and it is necessary to keep the percentage of low boiling, light, polar aromatics extraction solvent in the feed being contacted with the membrane at between from about 10 to 50 volume percent, and more preferably from about 15 to 35 volume percent more preferably about 20–30 volume percent. In order to maintain the desired solvent content in the feed it will be necessary to continuously add makeup solvent.

The membrane used must be compatible with the feed stream. It must preferentially permeate the aromatic components of the feed stream at an adequate and sustainable rate. Membranes which have been found to satisfy these requirements include those made from regenerated cellulose, cellulose esters and polyimide, preferably from cellulose acetate and polyimide, most preferably polyimide. Membranes which are polar or hydrophilic in nature allow interaction of the aromatic hydrocarbons with the membrane. Membranes made from cellulose acetate have higher selectivity toward aromatics than do the polyimide membranes. However, membranes made from polyimide demonstrate higher flux. For cellulose acetate membranes it has been discovered that highest selectivity to aromatic permeation is demonstrated by cellulose acetate membranes which exhibit 97% NaCl rejection when evaluated for water desalination. Membranes which exhibit higher rejection (smaller pores), as well as lower rejection (larger pore) have both been shown to have lower selectivity for aromatics permeation. Asymmetric membranes such as polyimide and cellulose acetate are preferred over symmetric membranes such as regenerated cellulose as they exhibit higher permeation rates.

The membrane is usually pretreated. Soaking the membrane in successive baths of solvent of decreasing polarity is an effective pretreatment procedure. Soaking in successive baths of water, methanol, toluene and the middle distillate feed has been employed. Extract phases, such as the NMP extract phase of a lube oil, can be permeated through regenerated cellulose membranes without any prior pretreatment as is shown in copending application, U.S. Ser. No. 561,169, filed Dec. 14, 1983. The resulting permeate containing, e.g., NMP, and aromatics would then have to be stripped (e.g., solvent stripped or water washed) to remove the NMP (which boils in the same range as the aromatics and, hence, is not amenable to distillation) from the desired aromatic product. For this reason, as previously stated, solvents such as NMP and other high boiling polar solvents are not desirable for use in the process of the present invention.

Polyimide membranes can be produced from a number of polyimide polymer sources. The identity of such polymers, the fabrication of membranes therefrom, and the use of such membranes to effect various types of separations are presented in numerous patents. See, for example, U.S. Pat. No. 4,307,135, U.S. Pat. No. 3,708,458, U.S. Pat. No. 3,789,079, U.S. Pat. No. 3,546,175, U.S. Pat. No. 3,179,632, U.S. Pat. No. 3,179,633, U.S. Pat. No. 3,925,211, U.S. Pat. No. 4,113,628, U.S. Pat. No. 3,816,303, U.S. Pat. No. 4,240,914, U.S. Pat. No. 3,822,202, U.S. Pat. No. 3,853,754, G.B. Pat. No. 1,434,629. In copending application U.S. Ser. No. 494,543, filed May 13, 1983 and its CIP, U.S. Ser. No. 546,302, filed Dec. 22, 1983, a process for producing an asymmetric polyimide polymer membrane from an undergraded fully imidized, highly aromatic polyimide copolymer, and the use of such membrane for the separation of mixtures of organic liquids is described. The asymmetric polyimide membrane described therein is the membrane of choice for use in the present process. As recited in U.S. Ser. No. 494,543 and U.S. Ser. No. 564,302, the polyimide polymer starting material is undegraded polymer (i.e. polymer which was not in contact with water for too long a time after production and prior to drying and granulation) and is preferably recovered using a non-aqueous solvent from commercially available solutions of the polymer in solvent. Upjohn 2080 DHV, which contains about 25% polymer in DMF solvent, is a suitable source. The polymer itself is the subject of U.S. Pat. No. 3,708,458 and is the cocondensation product of benzophenone 3,3',4,4'-tetra-carboxylic acid dianhydride (BTDA) and a mixture of di(4-aminophenyl)methane and toluene diamine, or their corresponding diisocyanates, 4,4'-methylenebis(-phenyl isocyanate) and toluene diisocyanate. As described in U.S. Ser. No. 494,543 and U.S. Ser. No. 564,302, for example, one liter of Upjohn 2080 DHV is transferred to a blender and three successive 300 ml portions of acetone are added with 5 min. mixing at low speed between each addition. Subsequently, the blender contents are emptied into a container and permitted to settle. The liquid is decanted and 1.5 liters of acetone added and the mixture stirred thoroughly. The mixture is filtered through a course filter (Whatman #4). The polymer is washed by remixing with another 2 liters of acetone. After filtering, the polymer is dried in vacuum (15 inches Hg) at 45°–60° C. for 3 hours. The polymer powder is ready for use.

A suitable membrane can be cast from this polymer using a casting solution comprising about 14–30 weight percent preferably about 16–25 weight percent, more preferably 18–22 weight percent polymer in dioxane:DMF solvent (1:1 to 10:1 D/DMF, preferably about 7:1 to 3:1). This solution is spread on a moving casting belt at a casting speed of about 3–5 ft/min. and the film allowed to partially evaporate in dry air, preferably for about 2–120 seconds more preferably about 2–30 seconds, before gelation in a gelation bath, which is preferably water (neutral pH). The gelation water is preferably replaced with glycerin to retard membrane deterioration (hydrolysis).

In practicing this upgrading permeation process, the membrane can be employed as an element in any convenient form. Membranes in the form of tubes or fibers can be bundled, potted and manifolded, much in the manner described in U.S. Pat. No. 3,228,877. Similarly, membranes in the form of sheets can be employed in plate and frame configuration or in the form of spiral wound elements some designs of which are in U.S. Pat. Nos. 3,417,870, 3,173,867, 3,367,504, 3,386,583, 3,397,790 to list just a few. The choice of glues and materials of construction will depend on the kind of solvent and feed stream as well as operating conditions.

The spiral wound element will typically comprise layers of membrane wound around a central tube (metal or solvent resistant plastic) containing holes for the permeate, the membrane layers being separated by alternate layers of a permeate carrier, such as knitted Simplex (Dacron, with melamine formaldehyde stiffener), and a feed spacer made of Vexar (a polypropylene mesh). Membrane layers are typically sealed using an epoxy adhesive to sandwich the permeate cloth into a closed envelope in fluid communication with the perforated central tube leaving the perforations in the central tube as the only permeate outlet. The preferred epoxy adhesive will generally comprise resin formulation such as one comprising (1) Epon 828, which is a reaction product of bisphenol-A and epichlorohydrin; (2) Cabosil M5; (3) Versamid 140 (a polyamide curing agent); (4) Estane 5707F-1 (a polyurethane from B. F. Goodrich); and (5) DMF solvent wherein the components 1/2/3/4/5 are present in typical relationship based on parts by weight of about 100/10/60/4/12, which cures at about 25° C. over a 21 day period. This adhesive system is described and claimed in copending application U.S. Ser. No. 494,409, filed May 13, 1983. The layers of membrane, permeate carrier, and feed spacer are wound around the central tube in a fashion consistent with preparing a spiral wound element. After the element is cured, the ends of the element are trimmed, a nylon seal carrier and a nylon anti-telescoping device are then added. The element is then covered on the outside with an epoxy reinforced fiberglass outer wrap. Elements of any size can be prepared, but typical elements are about 8 inches in diameter and about 40 inches long, and have about 225 square feet of membrane area and can be used at feed flow rates of about 30–50 gallons per minute at a 5–15 psi pressure drop.

The aromatics content of the middle distillate type stream used for the feed has a large impact on membrane performance and permeate quality. With a feed containing 80.5 percent aromatics, direct permeation through a polyimide membrane yields a permeate containing 86 percent aromatics while permeation in the presence of acetonitrile yields permeates of 95% aromatic content. Starting with a middle distillate (extract) containing 88.9 percent aromatics, direct permeation through a cellulose acetate membrane can yield a permeate with approximately 95% aromatics. Permeation of this feed mixed with acetonitrile would be expected to yield 95+% aromatic permeates. Feed streams containing between 80 and 90% aromatics are thus the preferred feeds for use in the process of the present invention.

Figure 1:
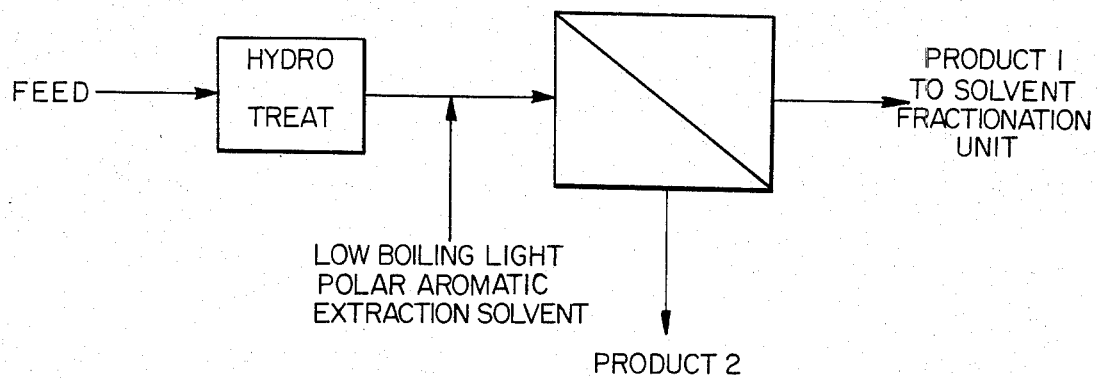
FIG. 1 is a schematic of the use of the present membrane process to upgrade low value middle distillate.

A scheme for the use of this process to directly upgrade a low value middle distillate stream is shown in FIG. 1. The feed would be a stream such as a cat cracker of coker middle distillate. These contain high levels of aromatics (preferably about 80+%) as well as sulphur and olefin impurities. The high level of aromatics makes the stream undesirable as a middle distillate fuel. Following hydrotreating to remove sulphur and olefins, the stream is mixed with a low boiling light polar aromatics extraction solvent and passed to a membrane unit which produces a more highly aromatic product (1) which is sent to solvent fractionation and a product (2) which can be or otherwise used. The membrane upgrading step is less expensive than liquid/liquid extraction and allows utilization of this inexpensive feed for heavy aromatic solvents.

Figure 2:
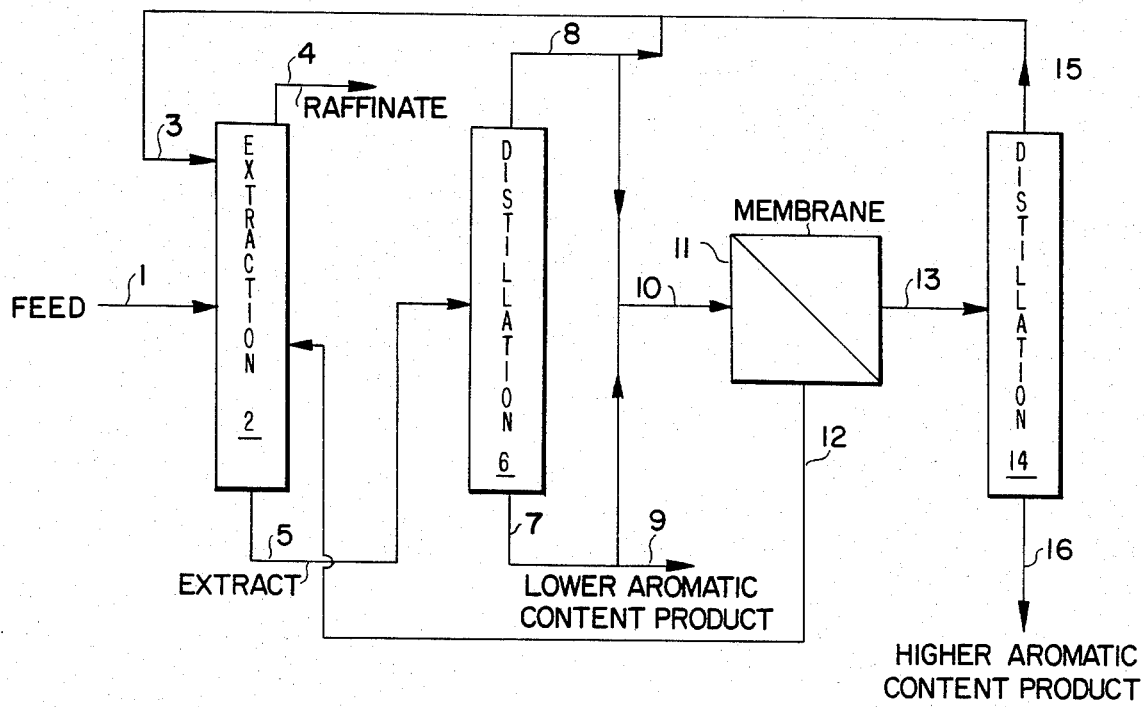
FIG. 2 is a schematic of the integration of the present membrane process with extraction and the permeation of feed with the extraction solvent.
Figure 3:
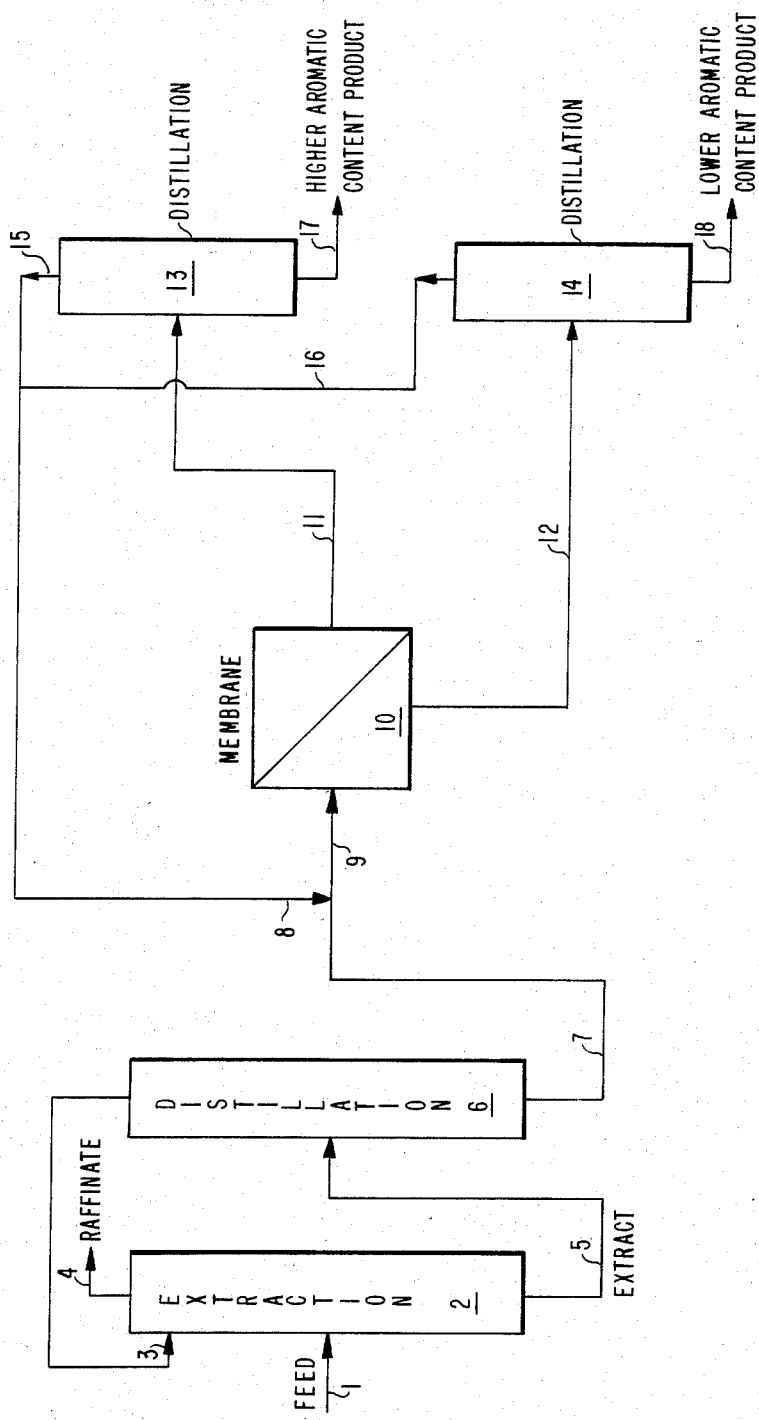
FIG. 3 is a schematic of the integration of the present membrane process with extraction and the permeation of feed with a separate solvent.

The possible integration of the membrane process with a liquid/liquid extraction process is shown in FIGS. 2 and 3.

As shown in FIG. 2, a middle distillate feed is introduced via line 1 into an extraction tower 2. A low boiling extraction solvent is introduced via line 3. The raffinate is removed via line 4. The aromatic extract plus solvent is removed via line 5 and is introduced to a flash tower 6, where solvent is removed via line 8 and bottoms via line 7.

The solvent free bottoms can be used as a lower (75-90%) aromatic content product. To upgrade the aromaticity of this product a suitable portion is combined with the low boiling light extraction solvent and introduced to a membrane unit 11 via line 10. Alternatively, if no lower aromatic content product is desired, the extract in tower 6 can be only partially flashed and the entire bottoms stream introduced to the membrane unit via line 10. The permeate from the membrane containing a more concentrated aromatics product plus extraction solvent is removed via line 13 and introduced to a distillation tower where the solvent is removed via line 15 and recycled in the extraction process and the aromatic product is removed via line 16. The rententate containing residual solvent (line 12) is recycled back to the extractor. The advantage of integration lies in the use of the low boiling, light polar aromatic extraction solvent as the membrane permeation assisting solvent.

A slightly different solvent assisted process is shown in FIG. 3. In this Figure, a different solvent from the extraction solvent is used for the solvent assisted membrane process. The aromatic extract in line 5 is introduced to distillation tower 6. The extraction solvent is recycled back to the extraction tower via line 3. To the solvent free extract in line 7 is added the low boiling light polar aromatics extraction solvent via line 8. The mixed feed is introduced via line 9 into the membrane unit 10. The aromatic rich permeate in line 11 is introduced to distillation tower 13. The solvent goes overhead via line 15 and the high aromatic content product exits via line 17. The aromatic poor retentate in line 12 is introduced to distillation tower 14. The solvent goes overhead via line 16 and the lower aromatic content produce exits via line 18.

Figure 4:
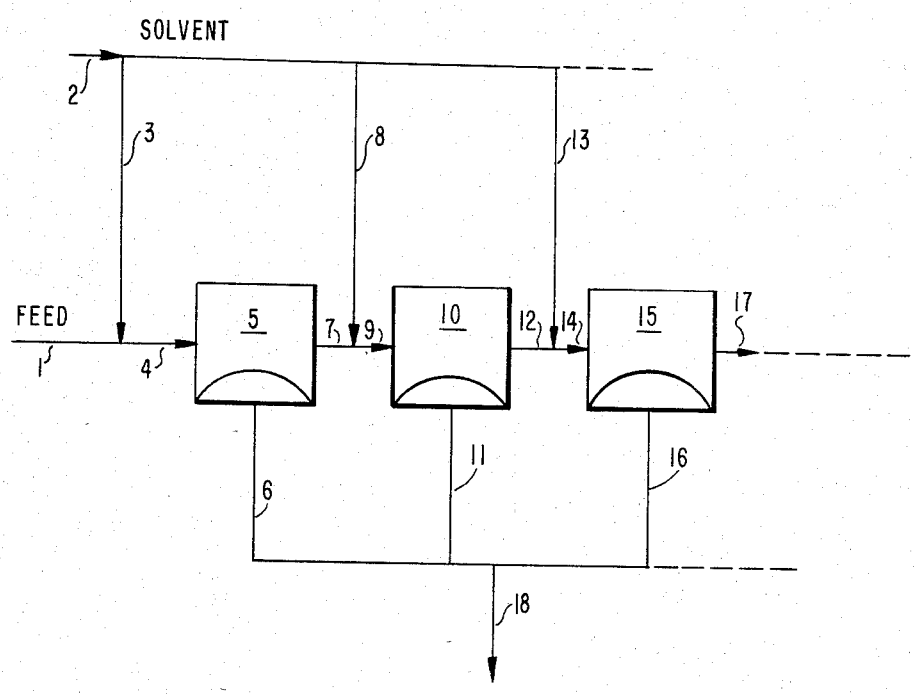
FIG. 4 is a schematic of a solvent assisted membrane unit.

A schematic of the membrane test unit is shown in FIG. 4. Feed is introduced via line 1 and the appropriate amount of solvent from line 3 is added. The mixed feed in line 4 is introduced to membrane unit 5. The permeate exits line 6 and the retentate exits line 7. To the retentate is added additional solvent from line 8 to bring the amount of solvent back into the desired range. This mixed feed is introduced to membrane unit 10. This process sequence repeats until the desired amount of permeate is collected.

The following examples illustrate specific embodiments of the present invention. In the examples, the membranes employed were in the form of films. Commercially available and laboratory produced membranes were tested.

EXAMPLE 1

Tests were conducted for the purpose of determining the steady state permeation rates and membrane selectivity towards aromatic permeation using a solvent free middle distillate extract for a feed. Membranes investigated included commercially available cellulose acetate membranes and membranes prepared in the laboratory from precipitated Upjohn 2080 polymer prepared from casting solutions containing the polymer in a 5/1 dioxane/DMF solution. The cellulose acetate membranes ranged in salt rejection from 92 percent to 99 percent. The higher the salt rejection corresponds to smaller pore size. The polyimide membrane was prepared from casting dopes containing 23, 24 or 25 percent undegraded polymer (i.e. polymer which was not in contact with water for too long a time after production prior to drying and granulations and the films were allowed to dry for 2 seconds before quenching in room temperature water. The higher concentration dopes yield membranes with smaller equivalent pores. The membranes were pretreated by successively soaking them in the following solvents, water, methanol, toluene and a $SO_2$ extracted middle distillate containing 88.9 percent aromatics. This feed was permeated through these membranes at 30° C. and 800 psig. The permeation rates and aromatic content of the permeate are shown in the table.

The results show that the aromatics content of the permeate increases as the pore size of the membrane decreases to a certain point. If the pore size further decreases, the aromatic content of the permeate declines. The cellulose acetate membranes yielded a more aromatic content permeate than did the polyimide. Although the desired permeate quality was achieved, the rate of permeation is very low.

TABLE

| Membrane | Permeation Rate $l/m^2$ day | Percent Aromatics in Permeate |
| --- | --- | --- |
| cellulose acetate 92% R NaCl | 14.0 | 94.5 |
| cellulose acetate 97% R NaCl | 9.7 | 95.1 |
| cellulose acetate | 2.4 | 93.5 |

TABLE-continued

| Membrane | Permeation Rate l/m² day | Percent Aromatics in Permeate |
|---|---|---|
| 99% R NaCl polyimide 23% conc. dope | 166.0 | 92. |
| polyimide 24% conc. dope | 32.6 | 92.9 |
| polyimide 25% conc. dope | 3.9 | 93.6 |

EXAMPLE 2

From example 1 it is seen that when selectivities approached the desired level of 95+% the rate of permeation (flux) tended to be very low. Therefore, tests were conducted for the purpose of determining the performance of a membrane (in this case a polyimide membrane) with a feed composed of a solvent free middle distillate $SO_2$ extract containing 88.9 percent aromatic hydrocarbons and various amounts of acetonitrile. This level of aromaticity (75–90%) is about what is expected from a liquid/liquid extraction step (such as shown in FIG. 2) or from cracked middle distillates. The polyimide membrane was prepared from a casting dope containing 24 percent polymer in 5/1 dioxane/DMF and the film was allowed to evaporate for 10 seconds before quenching in room temperature water. The membrane was pretreated as in Example 1. The feed containing the middle distillate and various amounts of acetonitrile was permeated through this membrane at 30° C. and 800 psig. The percent acetonitrile in the feed, the permeation rate, and the aromatic content of the distillate in the permeate are shown in the table.

The results show that, surprisingly, not only is flux improved but the aromatic content of the distillate in the permeate increases as the acetonitrile content in the feed increases to 30 percent. This is surprising since an increase in flux is usually accompanied by a decrease in selectivity. However, as the acetonitrile content increases further, while the flux continues to increase the aromatic content of the distillate in the permeate decreases. Thus it is seen that a solvent dilution range exists within which both flux and selectivity are improved.

| % Acetonitrile in Feed | Permeation Rate l/m² day | % Aromatics in Permeate Hydrocarbon | Hydrocarbon Rate l/m² day |
|---|---|---|---|
| 0 | 14.9 | 93.0 | 14.9 |
| 11.7 | 39.0 | 96.1 | 32.2 |
| 25.0 | 128.0 | 99.5 | 40.6 |
| 46.0 | 580.0 | 94.3 | 98.6 |

EXAMPLE 3

Tests were conducted for the purpose of determining the performance of a polyimide membrane with a feed composed of a middle distillate $SO_2$ extract containing 80.5 percent aromatic hydrocarbons and various amounts of either acetonitrile or a mixture of 80/20 acetonitrile/acetone. The membrane was the same as in Example 2 and was pretreated in the same manner. The feed containing middle distillate and various amounts of solvent was permeated through this membrane at 30° C. and 800 psig. The solvent used, the percent solvent in the feed, the permeation rate, and the aromatic content of the distillate are shown in the table.

The results from Examples 2 and 3 show that, overall, the aromatic content of the permeate distillate decreases as a lower aromatic content middle distillate is used for a feed. As the percent solvent increases up to a point, the permeate distillate aromatic content increases. As the percent solvent increases further, the aromatic content decreases. The 80/20 acetonitrile/acetone solvent overall yielded permeates with a lower aromatic content than did acetonitrile.

TABLE

| Solvent | % Solvent in Feed | Permeation Rate l/m² day | % Aromatics in Permeate Hydrocarbon | Hydrocarbon Rate l/m² day |
|---|---|---|---|---|
| Acetonitrile | 0 | 8 | 86.0 | 8 |
| " | 10.0 | 31.0 | 91.4 | 23 |
| " | 26.7 | 309.0 | 95.1 | 59 |
| " | 60.0 | 797.0 | 90.7 | 105 |
| 80/20 acetonitrile/acetone | 0 | 8 | 86.0 | 8 |
| 80/20 acetonitrile/acetone | 20.0 | 72.0 | 92.0 | 18 |
| 80/20 acetonitrile/acetone | 30.0 | 216 | 93.0 | 51 |
| 80/20 acetonitrile/acetone | 50.0 | 566 | 91.5 | 75 |

Therefore, from Examples 2 and 3, it is seen that a membrane adjunct to a liquid/liquid extraction process can act as a "polishing step" and yield an aromatic solvent of higher aromatic content. The data of Example 1 also show that a membrane can act in a similar capacity on low value aromatic distillates as described in FIG. 1.

EXAMPLE 4

Tests were conducted with $SO_2$ extracted middle distillate streams containing 50 to 70 volume percent aromatics. The polyimide membrane was the same as in Example 2 and was pretreated in the same manner. Acetonitrile was the solvent employed. The feed containing various amounts of solvent was permeated through the membrane at 30° C. and 800 psig. The permeation rates and aromatic content of the permeate are shown in the table. The results show that the aromaticity of feeds with 50 to 70% aromatics can be increased by the solvent-assisted process, however, more than one membrane separation stage will be required to reach the quality targets for high aromatic content solvents.

| V % Acetonitrile in feed | V % Aromatics in Feed Hydrocarbons | Permeation Rate l/m² day | Hydrocarbon Rate l/m² day | % Aromatics in Hydrocarbon Permeate |
|---|---|---|---|---|
| 11.7 | 70.4 | 88 | 58 | 78.6 |
| 21.7 | 70.4 | 339 | 67 | 82.4 |
| 13.4 | 52.4 | 227 | 108 | 63.3 |

EXAMPLE 5

Tests were conducted with middle distillates stream containing 21 volume percent aromatics. This is typical of a virgin distillate. The membrane used in this example was a regenerated cellulose membrane, RC 1,000, commercially available from Spectrum Medical Industries, Inc. This membrane has a molecular weight cut off of approximately 1,000 as determined using aqueous stream sizing procedure. The membrane was pretreated by successively soaking it in the following solvents water, methanol and acetone. The feed containing the middle distillate and various amounts of acetone was permeated through this membrane at 30° C. and 400 PSIG. The percent acetone in the feed, the permeation rate and the aromatic content of the distillate in the permeate are shown in the table. The results show that the aromaticity of feeds containing about 20 percent aromatics can be increased by the solvent-assisted process.

| V % Acetone in Feed | Permeation Rate l/m² day | Hydrocarbon Rate l/m² day | % Aromatics In Hydrocarbon Permeate |
|---|---|---|---|
| 50.0 | 146 | 35 | 27.7 |
| 31.7 | 109 | 45 | 29.1 |

However, more than one membrane separation stage will be required to reach the quality targets for high aromatic content solvents.

What is claimed is:

1. A process for producing high quality aromatic solvents in the middle distillate range containing 95+% aromatics comprising contacting a middle distillate feed having a molecular weight range of about 120 to 250 g/mole containing from 75 to 90% aromatics and diluted with a low boiling light polar aromatics extraction solvent wherein the concentration of said solvent in the feed is maintained between about 10 to 50 volume percent with a permselective membrane selected from regenerated cellulose, cellulose acetate and polyimide membranes under reverse osmosis conditions thereby selectively permeating the aromatic components of the distillate feed as the high quality solvent.

2. The process of claim 1 wherein the feed to the membrane is a straight middle distillate or the extract phase of a solvent extracted middle distillate.

3. The process of claim 1 wherein the feed to the membrane contains from 80 to 90% aromatics.

4. The process of claim 2 wherein the feed to the membrane contains from 80 to 90% aromatics.

5. The process of claim 1, 2, 3 or 4 wherein the permselective membrane is an asymmetric polyimide membrane.

6. The process of claim 1, 2, 3, or 4 wherein the concentration of said low boiling light polar aromatics extraction solvent in the feed is maintained between about 15 and 35 volume percent.

7. The process of claim 5 wherein the concentration of said low boiling light polar aromatics extraction solvent in the feed is maintained between about 15 and 35 volume percent.

8. The process of claim 6 wherein the concentration of low boiling light polar aromatics extraction solvent to feed is maintained between about 20 and 30 volume percent.

9. The process of claim 7 wherein the concentration of low boiling light polar aromatics extraction solvent to feed is maintained between about 20 and 30 volume percent.

10. The process of claim 6 wherein the light polar solvent is selected from $SO_2$, acetonitrile, nitroethane.

11. The process of claim 7 wherein the light polar solvent is selected from $SO_2$, acetonitrile, nitroethane.

12. The process of claim 8 wherein the light polar solvent is selected from $SO_2$, acetonitrile, nitroethane.

13. The process of claim 9 wherein the light polar solvent is selected from $SO_2$, acetonitrile, nitroethane.

14. The process of claim 6 wherein the light polar solvent is acetonitrile or a mixture of acetonitrile and acetone.

15. The process of claim 8 wherein the light polar solvent is acetonitrile or a mixture of acetonitrile and acetone.

16. The process of claim 8 wherein the light polar solvent is acetonitrile or a mixture of acetonitrile and acetone.

17. The process of claim 9 wherein the light polar solvent is acetonitrile or a mixture of acetonitrile and acetone.

* * * * *